(No Model.)
G. ROTHERHAM.
BELT FASTENING FOR DRIVING MACHINERY.
No. 471,140. Patented Mar. 22, 1892.
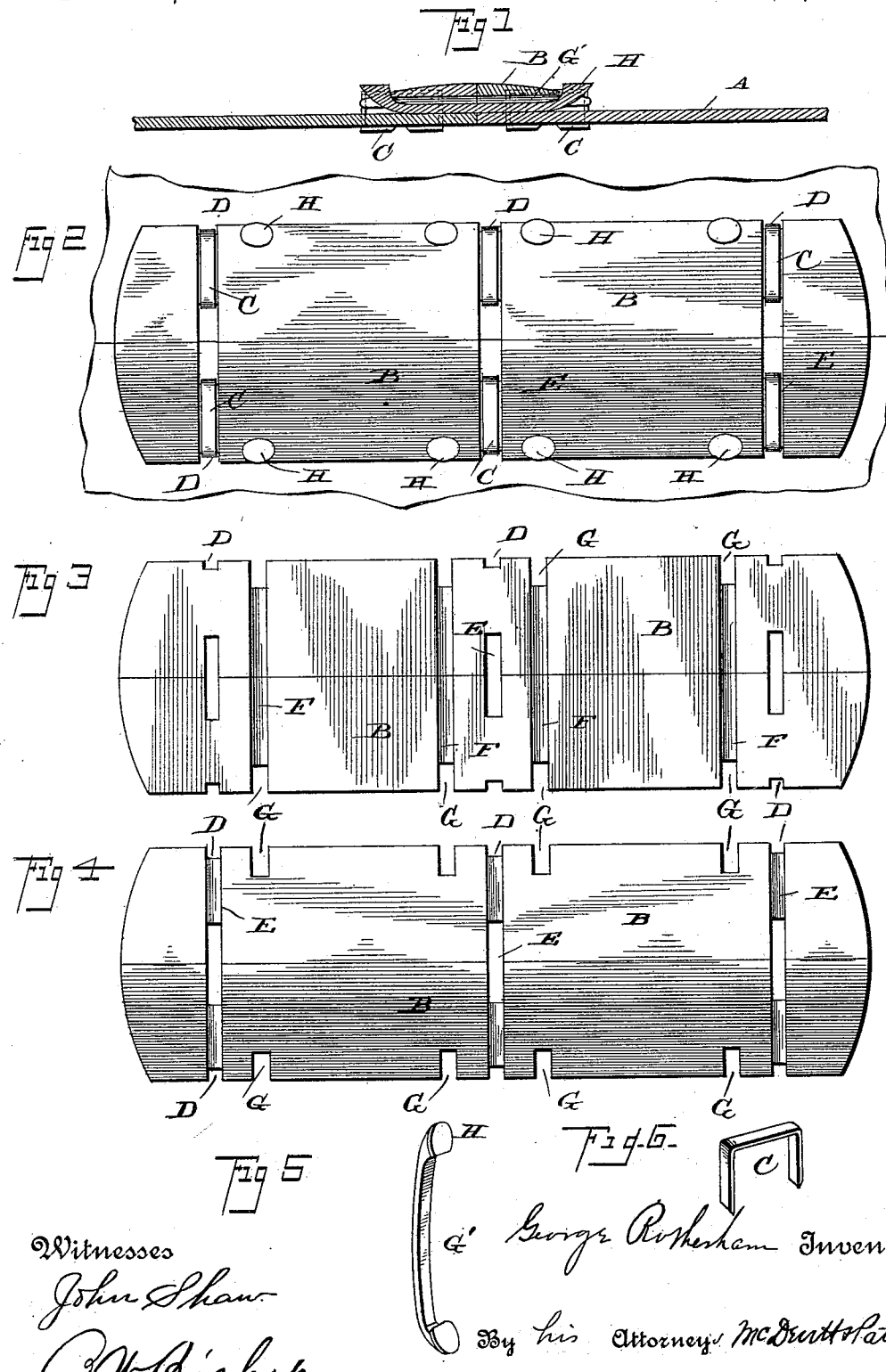

UNITED STATES PATENT OFFICE.

GEORGE ROTHERHAM, OF PHILADELPHIA, PENNSYLVANIA.

BELT-FASTENING FOR DRIVING MACHINERY.

SPECIFICATION forming part of Letters Patent No. 471,140, dated March 22, 1892.

Application filed September 11, 1891. Serial No. 405,432. (No model.)

*To all whom it may concern:*

Be it known that I, GEORGE ROTHERHAM, a citizen of the United States, residing at Philadelphia, in the county of Philadelphia and State of Pennsylvania, have invented certain new and useful Improvements in Belt-Fasteners; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in belt-fasteners; and it consists in certain novel features hereinafter described and particularly claimed.

In the annexed drawings, which fully illustrate my invention, Figure 1 is a longitudinal section of a portion of a belt having its ends connected and fastened by my improved device. Fig. 2 is a plan view of the same. Fig. 3 is a bottom plan view of the base-plates, and Fig. 4 is a top plan view of the same. Fig. 5 is a detail view of one of the links for connecting the base-plates. Fig. 6 is a detail view of one of the staples.

The belt A may be of any desired size and of any preferred material and forms no part of my invention. At the ends of the belt I provide the base-plates B, which are secured to the belt by staples C, inserted through the belt, and notches D in the edges of the plates B, and have their ends bent over upon the belt, their shoulders resting in grooves E in the outer sides of the plates, as clearly shown. It will be understood, of course, that any desired number of staples may be employed, according to the size of the belt; but for ordinary usage three staples, arranged as illustrated, will be found amply sufficient. In the under sides of the plates I form a series of grooves F, which terminate in notches G in the inner edges of the plates B, and the plates are connected by means of links G', which rest in the said grooves and are provided with heads H at their ends, adapted to engage the walls of the notches G, and thereby prevent their premature withdrawal.

In practice the plates are first connected by the links and then secured to the ends of the belt. In order to connect the plates, the links are arranged upon one of them in engagement with the grooves and notches, and the other plate is then engaged under the heads of the links and forced down upon the bodies of the same, as will be readily understood. The staples are then driven home in order to secure the fastener to the belt.

It will be observed that in the present device the strain is taken off the material of which the belt is composed, as the point at which the fastener is secured to the belt is some distance from the edge of the belt material.

My fastener presents a very neat appearance, as the links and securing-staples are both below the surface of the plates in grooves, and there are consequently no projections to be broken off by striking objects brought against the belt and to collect and retain dust and dirt. This arrangement furthermore gives the belt a smooth surface, so that it will pass around the pulleys very smoothly and easily.

The plates are constructed of metal, so as to possess great strength and durability, and may be used upon a number of different belts successively.

Having thus described my invention, what I claim, and desire to secure by Letters Patent, is—

1. In a belt-fastener, the combination of plates secured to the ends of the belt and links passing beneath said plates and having their ends detachably engaging the outer edges of the plates, whereby said plates are held together.

2. In a belt-fastener, the combination of the plates secured to the ends of the belt and provided in their under sides with grooves terminating in notches at the edges of the plates, and links resting in the said grooves and provided at their ends with heads adapted to engage the said notches.

3. In a belt-fastener, the combination of the plates connected together and provided with grooves in their upper sides and openings at the ends of the said grooves, the staples resting in the said grooves and having their ends inserted through the said openings and bent back against the belt, and links connecting the plates.

GEORGE ROTHERHAM.

Witnesses:
FRANK W. BEIRN,
JOHN J. MOLONY.